United States Patent [19]

Long

[11] Patent Number: 5,161,315
[45] Date of Patent: Nov. 10, 1992

[54] FLUIDIZED BED PARTICULATE MATERIAL TREATING APPARATUS

[75] Inventor: David H. Long, Springfield, Ohio

[73] Assignee: Jet-Pro Company, Inc., Atchison, Kans.

[21] Appl. No.: 796,905

[22] Filed: Nov. 22, 1991

Related U.S. Application Data

[63] Continuation of Ser. No. 576,265, Aug. 3, 1990, abandoned.

[51] Int. Cl.⁵ ............................................. F26B 17/00
[52] U.S. Cl. .................................... 34/57 A; 34/57 D; 432/58
[58] Field of Search ................. 34/57 R, 57 A, 57 D, 34/10, 11, 102; 110/245; 432/58; 122/4 D; 422/143; 165/104.16; 431/7

[56] References Cited

U.S. PATENT DOCUMENTS

3,361,539  1/1968  Pyzel .................................. 34/57 A
3,370,361  2/1968  Guerrieri .......................... 34/57 A
3,815,255  6/1974  Yamato ............................. 34/57 D
4,194,971  3/1980  Beeckmans ...................... 34/57 A
4,419,834  12/1983 Scott ................................. 34/57 D
4,608,766  9/1986  Kawai et al. .................... 34/57 A
4,787,152  11/1988 Mark ................................. 34/57 A
4,930,230  6/1990  Weckherlen et al. .......... 34/57 A

*Primary Examiner*—Henry A. Bennet
*Assistant Examiner*—Denise F. L. Gromada
*Attorney, Agent, or Firm*—Robert E. Stebens

[57] ABSTRACT

A fluidized bed particulate material treating apparatus is provided having a fluidizing bedplate formed with apertures of a frusto-conical configuration. The apertures are formed with walls divergent from an exit end at an angle in the range of 25-45 degrees with a plurality of apertures formed in the bedplate in closely spaced relationship resulting in interaction of the airflow from the apertures to levitate the material as it is transported over the bed by the air flowing through the apertures.

11 Claims, 5 Drawing Sheets

FLUIDIZED BED PARTICULATE MATERIAL TREATING APPARATUS

This is a continuation of co-pending application Ser. No. 07/576,265 filed on Aug. 31, 1990 now abandoned.

FIELD OF THE INVENTION

This invention relates in general to apparatus for treating of particulate material and specifically relates to apparatus designed to treat the particulate material through passage of heated, gaseous fluids through quantity of the particulate material. It relates more particularly to apparatus of that general nature in which the particulate material is transported by means of a fluidized bed through a zone where the gaseous fluid is applied to effect the treatment with the fluidized bed effecting levitation of the particulate material for enhancement of the treating process.

BACKGROUND OF THE INVENTION

This invention finds specific application in the field of treating agricultural grain products such as soybeans, corn and cereal grains in processes to condition those grains for more efficient usage as feed products for agricultural purposes such as the feeding of livestock such as cattle and hogs as well as other types of livestock. Food products such as soybeans require significant treatment to place them in a condition where they may be usable as a food product for livestock. Other grains are similarly treated to enhance their effectiveness in development of the nutrients required by the livestock such as dairy cattle in production of milk and in hogs for meat production. The treatment processes also enhance the efficacy of the grain and cereal products in the digestive system of livestock. One particular treating process that has been found uniquely effective in processing of grain such as soybeans as well as corn and other cereal grain is subjecting them to elevated temperatures of predetermined magnitude and particular length of time whereby the nutrients of the grains will be processed to a state where they are more efficient in the providing of the nutrients to the livestock during the course of the digestive process. Additionally, in connection with soybeans, such heat treatment also has the advantage of converting the soybeans to a state where they are more readily digested by livestock and thus substantially enhances their utilization.

Apparatus for effecting heat treatment of agricultural grain feed products have been devised and heretofore utilized, but they have not been found to be as efficient and effective in their operation as is desired. An example of a fluidized bed-type apparatus for treating of such particulate material as grain products is disclosed in U.S. Pat. No. 4,419,834 issued to John F. Scott on Dec. 13, 1983. That patent discloses an apparatus having a closed chamber provided with a perforated bedplate across which the grain products are caused to traverse while concurrently effecting a flow of heated air through the perforated plate to effect heating of the grain products. The heated air not only effects the treatment of the particulate material, but it is also utilized in effecting levitation of the particles thereby resulting in a fluidized bed of material. The fluidized bed facilitates the treatment through producing larger voids or spaces as between the particles whereby the air may more freely flow and will also be able to more thoroughly and completely flow around the individual particles and thus better assure that the process and treatment of the material is more effectively and fully completed.

The structure as disclosed in the Scott U.S. Pat. No. 4,419,834 incorporates a typical construction and component that are found in apparatus having fluidized bed operation. Such structures have typically included a bedplate over which the particulate material is caused to traverse and which is perforated with a relatively large number of apertures of relatively small diameter and having the objective of enabling a sufficient amount of air to flow through the plate and effect the levitation and treatment of the particulate material. In the Scott patent these holes are shown as merely being cylindrical in shape and of a specified size of the order of 3/32" diameter and located on 5/16" center lines to produce an open area that is of the order of 8.75% as stated in the specification of that patent. The cylindrical apertures or holes are typical of known apparatus of fluidized bed-type and this specific structural feature has been found to provide inadequate functioning of the fluidized bed, both as to the levitation as well as effecting of the treatment of the particulate material. One structural disadvantage of the cylindrical holes is that the conveyor devices utilized to cause traversing movement of the particulate material tend to force particles or portions of the particles into the apertures. With the cylindrical configuration of such apertures, the particles or portions thus forced into the holes will be retained through frictional forces and over a period of time will have the cumulative effect of interfering with the airflow to a very substantial extent as to materially interfere with the operation of the apparatus. It is thus required that the operation of the apparatus be interrupted at periodic times so as to permit cleaning of the perforated bedplate.

It is further noted that the cylindrical holes result in an airflow pattern that has not been found to perform with the desired degree of efficacy in effecting treatment of the material or in effecting the levitation of the material to enhance the treatment process.

SUMMARY OF THE INVENTION

In accordance with this invention, an improved apparatus is provided for treating of particulate material such as, for example, agricultural grain products including soybeans, corn and other cereal grains. The apparatus is primarily designed for a process that utilizes heated air to effect elevation of the temperature of the particulate grain material to a predetermined temperature whereby the available nutrients will be converted or transformed to a condition or status where they are more readily and fully digestible by livestock. Such treatment apparatus to which this invention is specifically directed is of a type which is characterized by having a fluidized bed of the particulate material and which in a fluidized state is transported through a treatment zone. This fluidized bed is effected by providing of a perforated bedplate over which quantities of the grain or particulate material are caused to traverse by mechanical transport mechanism such as drag-type conveyors while concurrently causing a flow of air at an elevated temperature to penetrate through the perforated bedplate and to then also pass upwardly through the bed of particulate material whereby the material, due to the volume of air and its velocity, will be levitated and thereby increase the spacing between the particles and enhance heat transfer and the processing of the material. In accordance with this invention, a perforated bedplate is provided having a plurality of apertures formed therein that are of a unique and novel configuration that substantially enhances the effectiveness and efficiency of the apparatus as compared to prior art apparatus of this type utilizing the perforated bedplates having apertures of cylindrical configuration. The perforated bedplate provided by this invention has apertures that in the specific illustrative embodiment which are of a frusto-conical shape, either straight-walled or arcuately curved, having the smallest diameter end formed at an upper surface of the plate and forms the exit opening through which the treating air exits into the particulate material that is being transported over the bedplate.

Also in accordance with this invention, the perforated bedplate that is provided has the frusto-conically shaped apertures dimensionally configured such that the walls are divergent from the exit end at an angle to the longitudinal axis of the order of 30 degrees. This angular configuration has been found to provide a substantially enhanced airflow with respect to particular grain material such as soybeans and corn as well as other agricultural grains in effecting the desired levitation of those grains and kernels in addition to effecting an advantageous airflow pattern through the materials that has significantly improved the efficiency of the treating process through a fluidized bed apparatus of this nature. Additionally, in accordance with this invention, the exit ends of the apertures in the perforated bedplate have a diameter of the order of 3/16" with the spacing of the apertures being of the order of ¼" with reference to their respective center lines. This dimensional relationship and arrangement of the apertures such as in ordered rows and columns produces a plate which has an open area which is the cumulative area of the exit ends of the apertures that is of the order of 11% of the total surface area of the perforated bedplate.

These and other advantages and objectives of this invention will be readily apparent from the following detailed description of a perforated bedplate embodying this invention as well as a particulate material treating apparatus incorporating the innovative perforated bedplate and the accompanying drawings illustrative the structure of the apparatus and the perforated bed plate.

DESCRIPTION OF A FLUIDIZED BED PARTICULATE MATERIAL TREATING APPARATUS AND THE PERFORATED BEDPLATE EMBODYING THIS INVENTION INCORPORATED THEREIN

Figure 1:
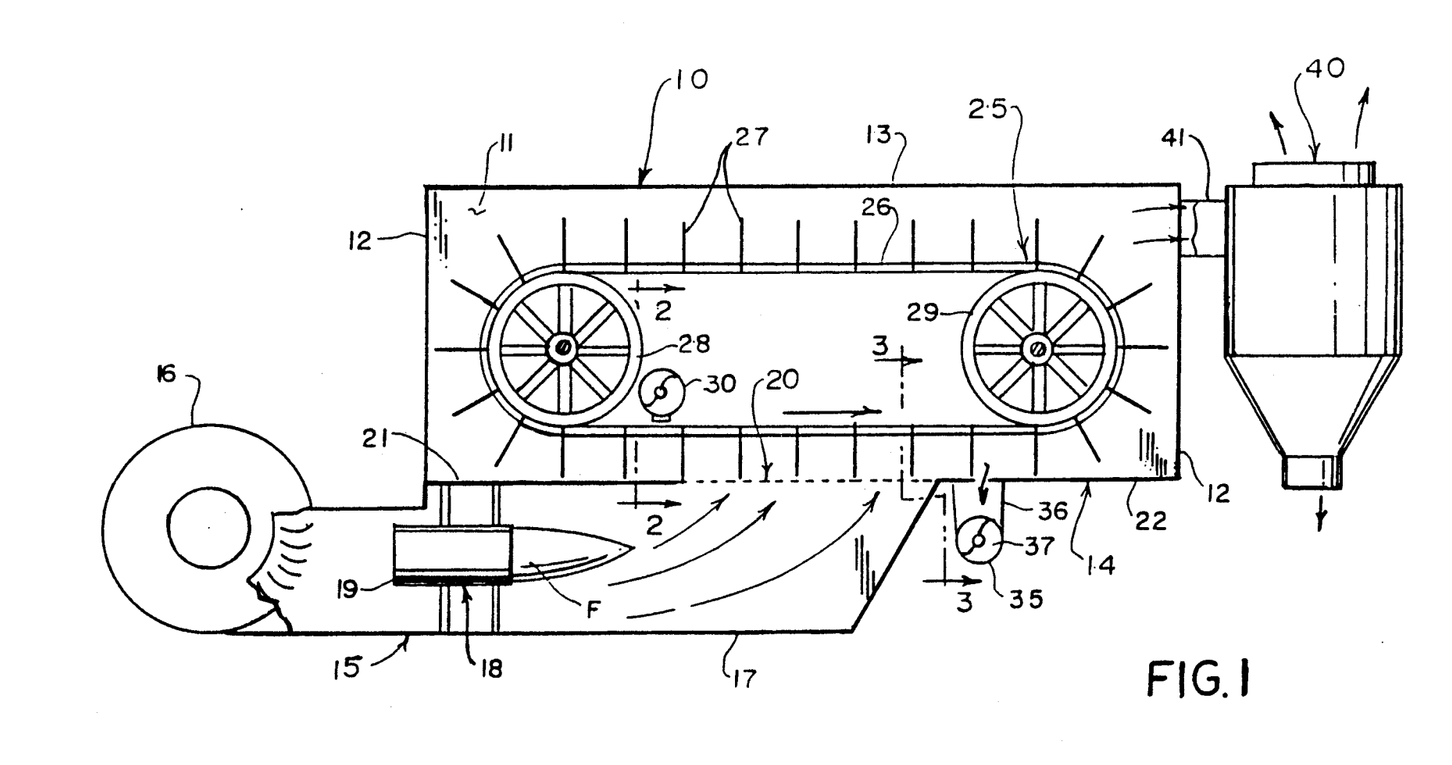
FIG. 1 is a diagrammatic side elevational view of a particulate material treating apparatus of the fluidized bed type and incorporating the perforated bedplate of this invention.
Figure 2:
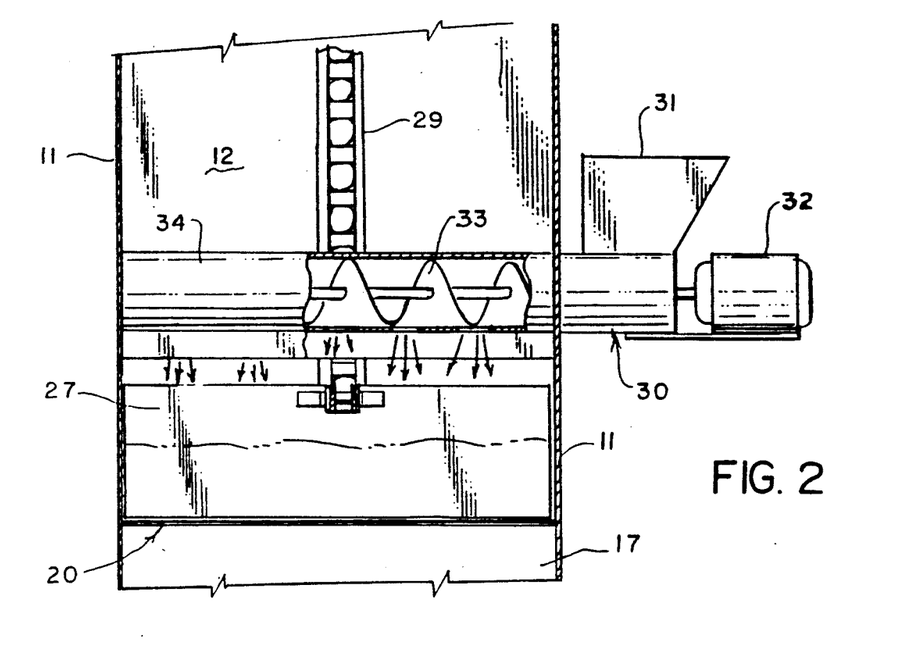
FIG. 2 is a fragmentary sectional view on an enlarged scale taken along line 2—2 of FIG. 1.
Figure 3:
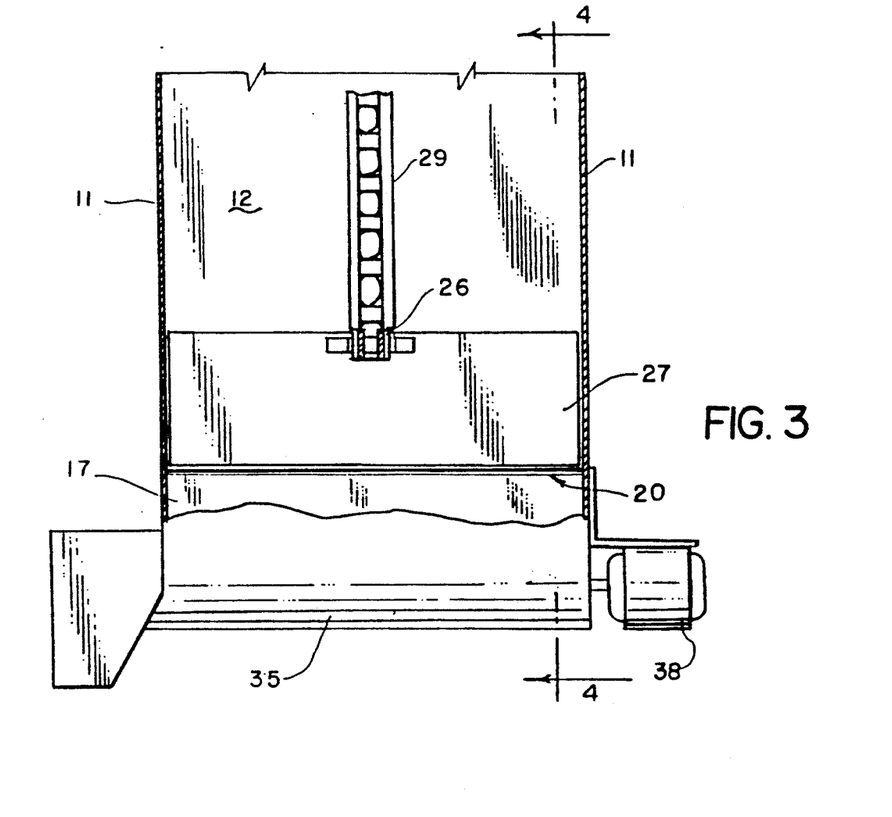
FIG. 3 is a fragmentary sectional view taken along line 3—3 of FIG. 1.
Figure 4:
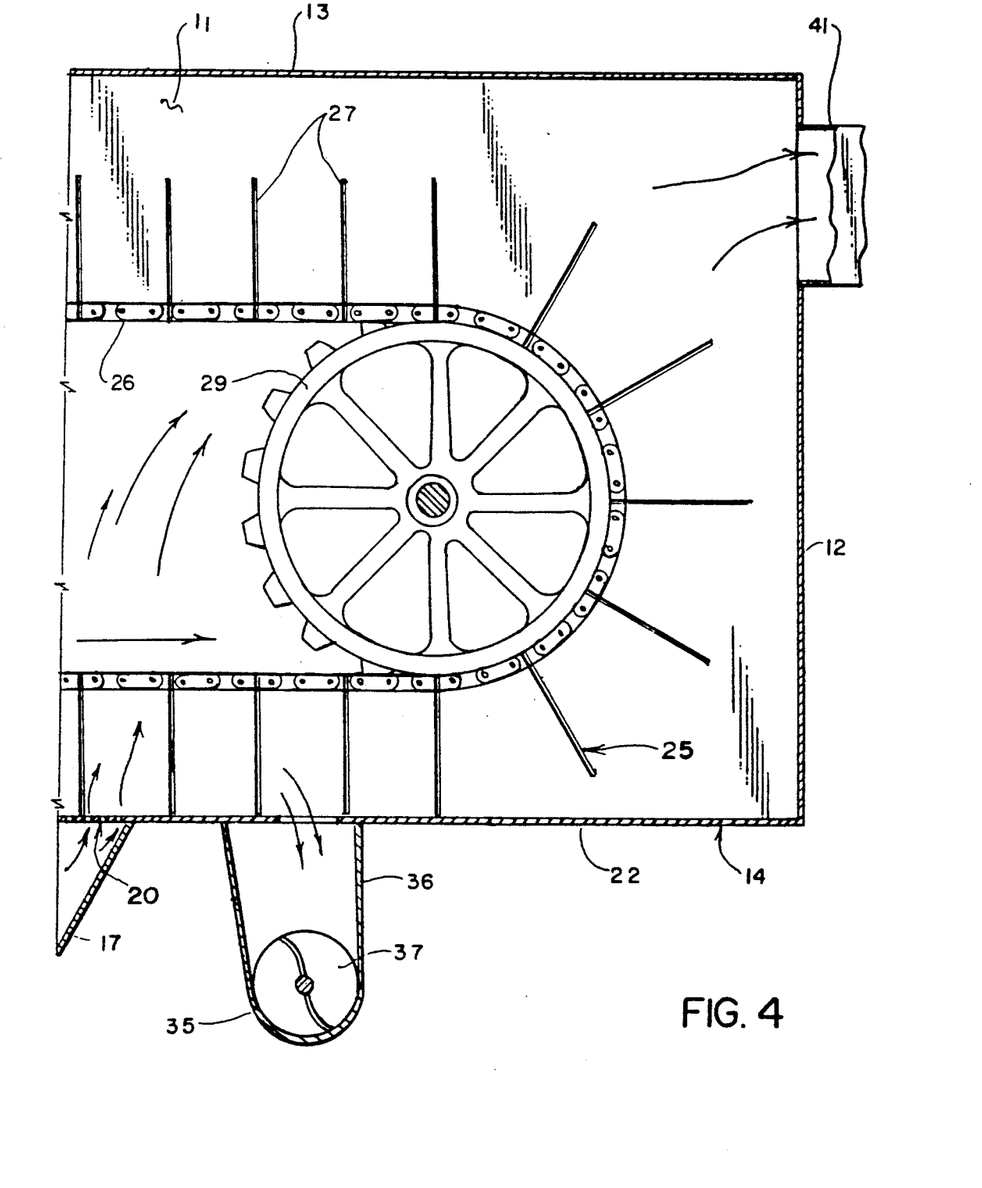
FIG. 4 is a fragmentary sectional view on a further enlarged scale taken along line 4—4 of FIG. 3.

Referring to FIGS. 1-4, an apparatus of the fluidized type for treatment of particulate material is diagrammatically illustrated as structural elements of such an apparatus are not a part of the invention, and thus, mechanical specifics are not deemed necessary for a thorough explanation and understanding of the invention. Referring specifically to FIG. 1, the apparatus includes a substantially closed chamber 10 in which the treatment process is effected. This chamber as can be seen by reference to FIGS. 2-4 is of a substantially elongated shape having a rectangular cross-section. Thus, it includes longitudinally extending and vertically disposed sidewalls 11 closed at their opposite ends by vertical endwalls 12 and closed at the top by a top wall 13. The chamber 10 is provided at its bottom with a composite bottom wall 14 comprising several elements or components.

In this illustrative embodiment of the invention, the objective is to effect treatment of the particulate grain materials by application of the heated air at a temperature which is sufficient to convert or transform the nutritional constituents of such grain to a more digestible state. Accordingly, the apparatus includes a heated air supply designated generally by the numeral 15. That air supply 15 includes a blower 16 communicating with an air distribution chamber 17 that underlies the bottom wall 14 of the treatment chamber 10. Included in the heated air supply 15 is a heat source designated generally by the numeral 18 which may advantageously comprise a burner apparatus 19 fueled by a combustible fuel such as either natural gas, propane or other similar petroleum products. The burner apparatus 19 is disposed within the distribution chamber 17 in downstream relationship to the blower 16 whereby its generated flame pattern F is disposed in the path of air exiting from the blower to effect an optimum transfer of heat to that air. Mechanical specifics of the blower 16 as well as the heat source 18 are not deemed to be of patentable significance or novelty as to the bedplate of this invention and these components are selected on the basis of engineering design considering the appropriate criteria as to the heat transfer requirements of the apparatus and its operational capability. Similarly, the controls and operating mechanisms such as a motor for driving of the blower and the fuel supply for the heat source 18 are elements of engineering design consideration and do not constitute a part of the invention as they will be readily understood by those familiar with apparatus of this type and will be designed in accordance with the capacity and operational requirements of a particular apparatus.

As previously noted, the bottom wall 14 of the treatment chamber 10 is of composite construction and includes as its primary component a perforated or fluidizing bedplate 20. The specific construction and configuration of the bedplate 20 will be subsequently described in substantial detail and referenced to figures of the drawings that clearly illustrate that structure. At this point, it will be noted that the bedplate 20 extends for a predetermined longitudinal distance along the bottom wall of the treatment chamber 10 with the remaining portions of that bottom wall including an entrance endplate 21 and an exit endplate 22. The entrance and exit endplates 21, 22 are not perforated, and thus, do not permit passage of air either into or from the closed chamber 10.

Disposed within the chamber 10 is a transporting mechanism 25 for effecting movement of the particulate material from an entrance end across the perforated or fluidizing bedplate 20 to an exit end where the particulate material is removed from the chamber. Referring to FIG. 1, the entrance end is that which is associated with the left-hand portion of the chamber 10 and the exit end is that associated with the right-hand portion of that chamber. The transporting mechanism 25 in this illustrative embodiment comprises a drag conveyor apparatus which includes an elongated, continuous chain 26 carrying a number of flights 27. The chain 26 is trained to extend around a pair of supporting wheels 28 and 29 that are disposed in longitudinally spaced relationship to each other and are disposed in outwardly spaced relationship to each respective end of the perforated bedplate 20. These wheels 28 and 29 are disposed in a vertical plane such that the conveyor revolves in a vertical plane and the flights 27 are thus caused to revolve in an elongated pattern including a bottom run and a top run. The bottom run is disposed such that the bottom edges of the flights 27 will be caused to ride over the upper surface of the bedplate 20 and are thus effective in assuring that the particulate material will be transferred from the entrance into the exit end of the chamber. At least one of the wheels such as 28 is of a sprocket type having teeth designed to engage with the chain 26 to impart a driving rotation movement to effect the operation. Utilization of a veriable speed drive motor mechanically coupled to the wheel 28 along with the appropriate control mechanisms provides a means to revolve and control the speed of the conveyor and thereby effect control over the time during which the particulate material is in the processing zone.

Introduction of the particulate material into the chamber 10 can be effected by any number of known mechanisms. In the illustrative embodiment, an auger-type conveyor 30 is positioned adjacent the entrance end over the entrance endplate 21 and above the lower run of the conveyor chain. This auger conveyor 30 extends transversely across the chamber and has an entrance hopper 31 for receiving the material. A drive motor 32 rotates an auger 33 extending through an elongated distribution tube 34.

Removal of the material following its processing may also be effected by means of an auger-type conveyor 35. This discharge conveyor 35 is disposed to extend transversely of the chamber 10 beneath the exit endplate 22 and includes a receiving hopper 36 opening into the interior of the chamber and positioned with respect to the transporting conveyor 25 so that the flights 27 will propel the grain or other particulate material into the receiving hopper 36. An elongated auger 37 is disposed in that auger and is driven by a motor 38 to move the collected material out through a discharge end into a receiver.

Exhaust of the air caused to enter the chamber 10 is effected through a cleaner and filter mechanism indicated generally by the numeral 40. This cleaning mechanism 40 may be of a cyclone separator type having an entrance connected by a duct 41 to the endwall 12 at the exit end of the chamber. The cleaning mechanism is located adjacent the discharge end of the chamber and air moving upwardly through the material in effecting processing will carry fine particle debris and will be discharged through the filter where such debris will be collected for subsequent removal. It will be noted that the input and discharge augers, conveyor 30 and 35, are both effective to prevent exhausting of the air through either of those mechanisms. This assures that all of the air that is introduced into the chamber will be exhausted through the filter mechanism 40.

Figure 5:
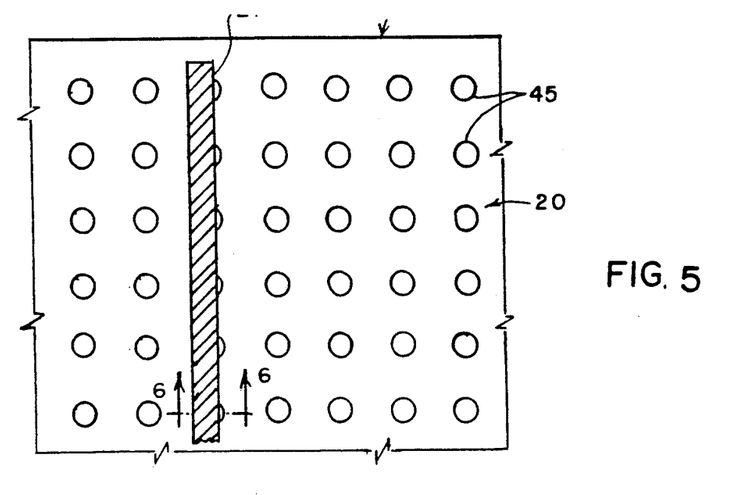
FIG. 5 is a fragmentary top plan view on a substantially enlarged scale of a portion of the perforated bedplate incorporated in the apparatus of FIG. 1.
Figures 6, 8, 10:
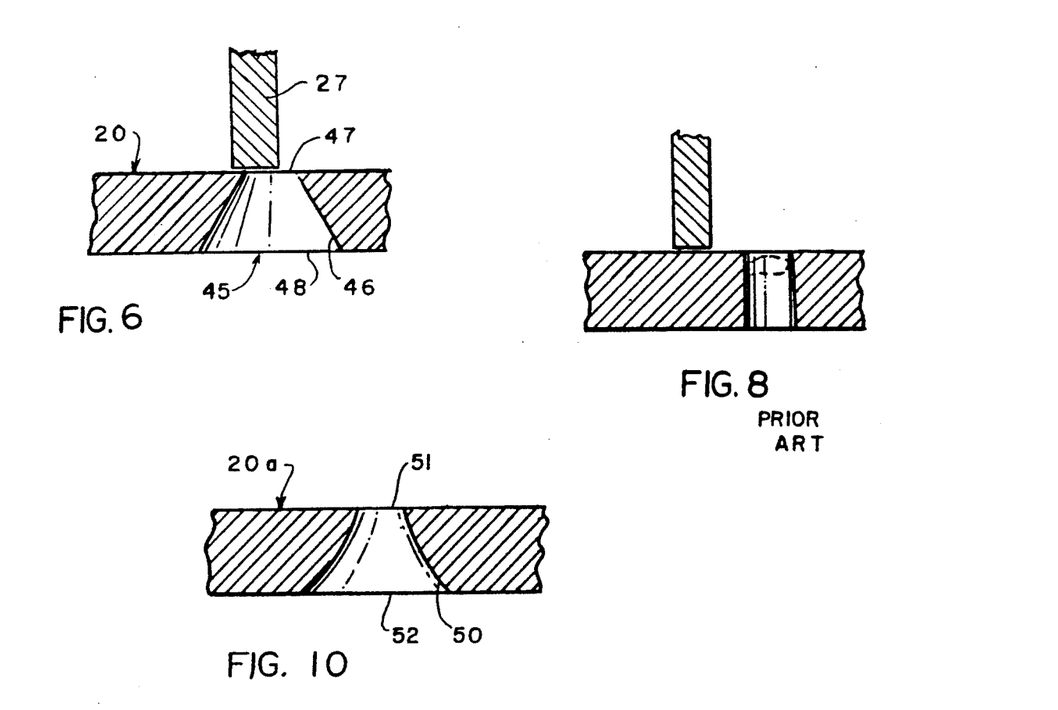
FIG. 6 is a fragmentary sectional view taken along line 6—6 of FIG. 5 and on a further enlarged scale.
FIG. 8 is a fragmentary sectional view similar to FIG. 6, but showing the configuration of the prior art types of bedplates and cylindrical apertures formed therein.
FIG. 10 is a fragmentary sectional view similar to FIG. 6 showing a modified configuration aperture formed in a bedplate.

In an illustrative embodiment of an apparatus embodying this invention, the perforated or fluidizing bedplate 20 has a transverse dimension of approximately 31 inches and has a length approximately 10' and 6". This dimension for the bedplate provides sufficient surface area and space for accommodating a specified amount of the particulate materials or grain products that can be transmitted or conveyed over the bedplate during a specified time period for treatment. A portion of the bedplate embodying this invention is illustrated in FIG. 5 in plan view with a portion of a conveyor flight 27 passing over that plate. In an illustrative embodiment, the fluidizing bedplate 20 is formed with a relatively large number of apertures, about 14,000, which are arranged in uniform rows and columns. In this particular embodiment, these apertures are of a size and configuration to provide an enhanced airflow and capability for treatment of particulate material. These apertures 45 in the illustrative embodiment of the bedplate as shown in FIGS. 5 and 6 are of a frusto-conical shape with the sidewall 46 thereof divergent from the smaller or exit end 47 toward a larger entrance end 48. This fluidizing bedplate 20 is fabricated from steel and has a thickness dimension of the order of $\frac{1}{4}$". This thickness dimension is determined in part by the structural strength and rigidity required to support the desired quantity of particulate material and to also accommodate the elevated temperatures at which it will be operated. The thickness is not limited to $\frac{1}{4}$" and where necessary to provide adequate structural strength, it is contemplated that the thickness could be extended to at least $\frac{1}{2}$".

The apertures 45 from a dimensional standpoint have an exit end 47 of a diameter of the order of 3/16", although this diameter could be enlarged to approximately $\frac{1}{4}$". The sidewalls 46 have a divergent angle of the order of 30 degrees in this illustrative embodiment, but this angular relationship could be varied between 25 degrees and 45 degrees. The dimensional relationships are varied or may be varied within these parameters with due consideration to the volume of air that is to be passed through the bedplate and the quantity of material that is being transported through the processing zone during a particular time period. Another criteria to observe in the dimensional designing of the apertures 45 is their number and spaced relationship in the plate. It has been found that having a fluidizing bedplate wherein the area of the exit ends of the apertures produces a composite open area in the range of 11 to 14% of the total area of the plate provides the best operation from not only the effectiveness of the airflow in levitating the particles, but in effecting the treating process and to also provide the best efficiency as to the input power requirements for obtaining the desired airflow.

In an operating embodiment of the apparatus incorporating the fluidizing bedplate of this invention, an airflow of the order of 12,000 cfm produced excellent results in effecting treatment of soybeans where the inlet temperature of the air through the fluidizing bedplate was of the order of 600 degrees Fahrenheit.

Figure 7:
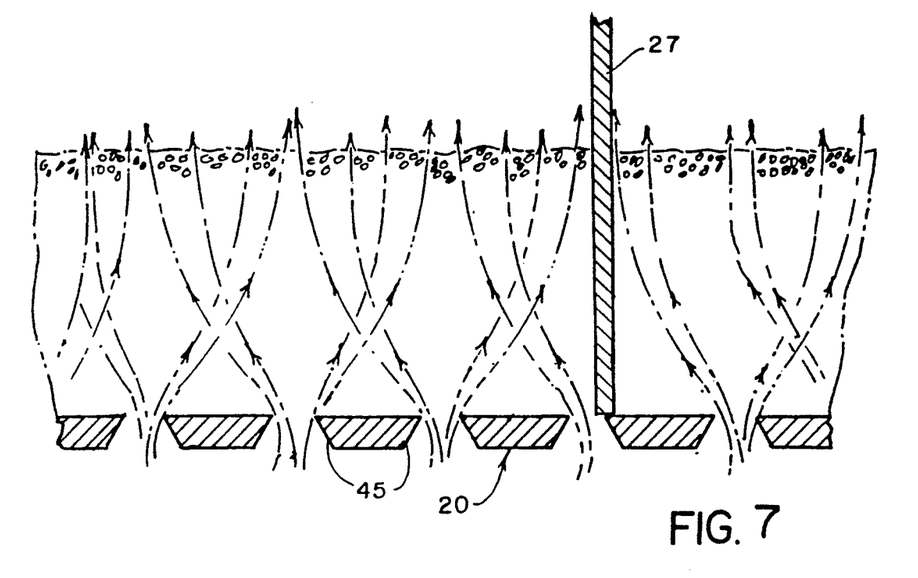
FIG. 7 is a diagrammatic elevational view of the perforated bedplate and demonstrating airflow patterns and effect on the particulate material.

This increased efficacy of the fluidizing bedplate of this invention is in part achieved through the frusto-conical shape of the apertures. That shape approximates a venturi-type tube and thus modifies the pressure and velocity of the air passing through such an aperture and at its exit into the space occupied by the particulate material. Not only is there a change in the velocity and pressure, but there is a marked distinction in the airflow pattern itself. The airflow as it exits from the apertures will tend to revolve in a helical path in an upward direction rather than merely following a straight line path as is the case with a cylindrical type aperture. The combined effects of pressure and velocity along with the airflow results in the air being able to better cause levitation of the particles and, in addition, there is, because of the longer path taken by the air, a greater capability to effect a transfer of heat to the particulate material through which the air is traveling. This results as a consequence of there being an increased amount of time for such contact of the air with the particulate material and heat transfer is dependent in large part upon the contact time. The effect of the airflow is diagrammatically illustrated in FIG. 7 of the drawings. It is to be noted that this is a diagrammatic illustration of the airflow and is not to be considered an accurate representation. FIG. 7, however, does also diagrammatically illustrate the relatively uniform levitation pattern of the particles of the product being processed. In general, a bed of the particulate material having a predetermined depth such as being of the order of 3" when not fluidized, will generally have a depth of the order of 6" when fluidized by the air passing through the fluidizing bedplate of this invention. In addition to the helical swirling flow of air in an upward direction, a rolling motion will be imparted to the particulate material as it moves or flows toward the exit end of the chamber. This rolling motion also aids in increasing the time duration of contact with the heated air as well as enhancing the ability of the air to come into contact with the entire surface of the particles, thereby improving the ability to transfer heat to the particles.

Figure 9:
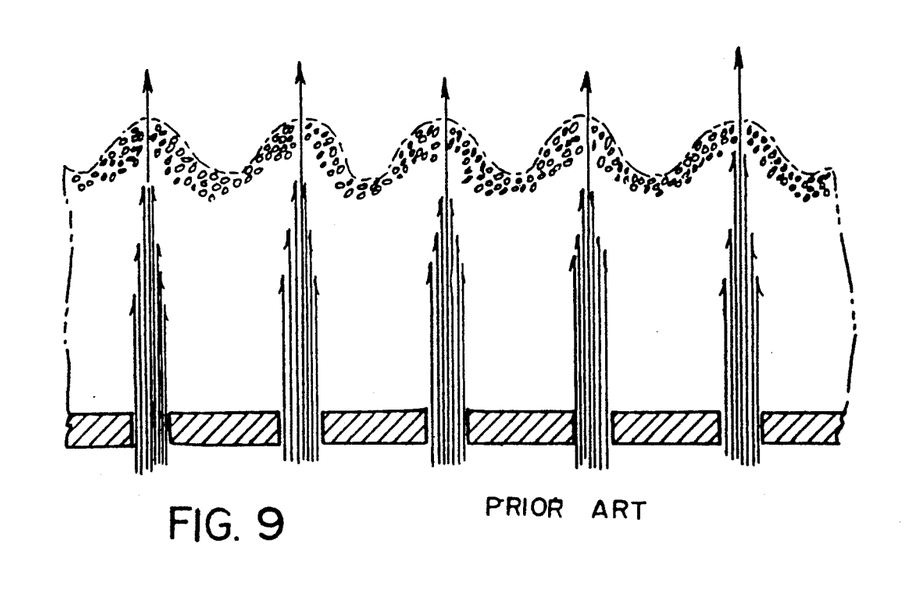
FIG. 9 is a diagrammatic illustration showing airflow patterns and effect on particulate material similar to that of FIG. 7, but related to the prior art bedplate structure of FIG. 8.

FIGS. 8 and 9 illustrate the prior art fluidizing beds utilized in treating apparatus of this type. Such fluidizing beds are provided with straight-walled, cylindrical apertures through which the air passes in a pattern which is diagrammatically illustrated in FIG. 9. The air passing through such cylindrical apertures has a velocity characteristic symbolized by the relative lengths of the directional arrows shown in FIG. 9. There is a substantial frictional drag effect caused by the straight, cylindrical walls, and thus, the central portions will be moving at a substantially faster rate. This has an effect of causing an uneven levitation pattern in the particulate material and this is diagrammatically illustrated in FIG. 9.

Another advantage of the frusto-conically shaped apertures 45 in the fluidizing bedplate of this invention is that the tendency of such apertures to become clogged or plugged by the particulate material is significantly reduced as compared to the straight cylinder apertures of the prior art. The reason for this is that the conveyor flights as they pass over the bedplate have a tendency to push some of the particles downwardly into the apertures. With a cylindrical aperture as is shown in FIG. 8, the sidewalls have a greater ability to retain the particle and thus result in the blocking of said aperture to further airflow. This is not the case with respect to the frusto-conical apertures as the divergent walls have a significantly less capability of frictionally engaging with a particle that is pushed through the small exit end and the particle will not likely be retained on the sidewalls of the aperture.

While the apertures have been described and illustrated as having straight-lined sidewalls, they may have different configurations so long as the general frusto-conical shape is retained. FIG. 10 illustrates a bedplate 20a having apertures 50 formed with arcuately curved sidewalls extending from the exit end 51 toward the entrance end 52.

In addition to the enhanced performance in treatment of the particulate material with the apparatus of this invention using the bedplate formed with the frusto-conical apertures, there are other significant advantages obtained with this invention over the prior art bedplates having cylindrical apertures. One further advantage is that the airflow patterns produced by this bedplate result in a substantial reduction in the power requirements for effecting the airflow and consequent reduction in operating costs. A second further advantage is that the airflow patterns developed by the frusto-conical apertures substantially reduce the noise that is generated as compared to bedplates having the cylindrical walled apertures of the prior art.

It will be readily apparent that an improved apparatus is provided by this invention for processing particulate material. The bedplate formed with apertures of frusto-conical shape results in greatly improved operation and efficiency.

I claim:

1. A fluidizing bedplate for a particulate material treating apparatus comprising an elongated, sheet-form plate of predetermined surface area adapted to be supported in a horizontal plane within a treating apparatus and having a top surface for support of a bed of particulate material thereabove during its traversing movement longitudinally thereover and a bottom surface, said plate having a plurality of apertures formed therein in relatively spaced relationship and distributed over a predetermined area of said plate through which gaseous fluid is caused to flow and pass upwardly through a bed of particulate material traversing over said plate, said apertures having an entrance end lying in the plane of said bottom surface, an exit end lying in the plane of said top surface and an axial wall surface extending between and interconnecting said entrance and exit ends, a substantial proportion of said apertures having the wall surfaces thereof configured in a generally frusto-conical shape and divergent in a direction away from said exit end at an angle in the range of 25 to 45 degrees with respect to the longitudinal axis of a respective aperture with the apertures having divergent wall surfaces being disposed in substantially uniformly distributed relationship over the apertured area of said sheet-form plate, said plate being of a predetermined minimum thickness whereby said apertures with the divergent wall surfaces produce a controlling effect on the flow path of gaseous fluid exiting from those apertures to cause at least a portion of the gaseous fluid exiting therefrom to initially flow along paths laterally divergent to the aperture's longitudinal axis and passing through a bed of particulate material traversing over said plate thereby producing dispersion of the gaseous fluid in a generally upward direction along random flow paths through the bed of particulate material for causing substantially uniform levitation and agitation of the particulate material.

2. A fluidizing bedplate according to claim 1 wherein said diverging axial walls are disposed at an angle of the order of 30 degrees with respect to the longitudinal axis of the respective fluid-transmitting apertures.

3. A fluidizing bedplate according to claim 1 wherein said exit end of said fluid-transmitting apertures is circular and has a diameter of the order of 3/16 inch.

4. A fluidizing bedplate according to claim 1 wherein said exit ends of said fluid-transmitting apertures are circular having a diameter in the range of 3/16 inch to ¼ inch.

5. A fluidizing bedplate according to claim 1 wherein said fluid-transmitting apertures are disposed a minimum center-to-center distance with respect to a next adjacent fluid-transmitting aperture of the order of ½ inch.

6. A fluidizing bedplate according to claim 1 wherein said fluid-transmitting apertures are disposed in a plurality of spaced parallel rows extending in parallel relationship to the direction of movement of the particulate material over the bedplate.

7. A fluidizing bedplate according to claim 1 wherein said fluid-transmitting apertures are disposed in a plurality of spaced parallel rows extending in transverse relationship to the direction of movement of the particulate material over the bedplate.

8. A fluidizing bedplate according to claim 1 wherein said fluid-transmitting apertures are disposed in a plurality of spaced parallel rows extending in both parallel and transverse relationship to the direction of movement of the particulate material over the bedplate.

9. A fluidizing bedplate according to claim 1 wherein the divergent axial wall surfaces of said apertures are of straight line configuration in an axial direction.

10. A fluidizing bedplate according to claim 1 wherein the divergent axial wall surfaces of said apertures are of arcuate configuration in an axial direction.

11. A particulate material treating apparatus comprising an elongated treating chamber through which a continuous bed of particulate material is caused to traverse from an inlet end to a discharge end along a horizontal path, said chamber including a bedplate disposed in a substantially horizontal plane and having an upwardly facing top surface for support of particulate material thereabove during its traversing movement thereover and a downwardly facing bottom surface, said bedplate having a plurality of apertures formed therein through which gaseous fluid is caused to flow and pass upwardly through the bed of particulate material traversing over said bedplate, said apertures having an entrance end lying in the plane of said bedplate's bottom surface, an exit end lying in the plane of said bedplate's top surface and an axial wall surface extending between and interconnecting said entrance and exit ends, a substantial proportion of said apertures having the wall surfaces thereof configured in a generally frusto-conical shape and divergent in a direction away from said exit end at an angle in the range of 25 to 45 degrees with respect to the longitudinal axis of a respective aperture with the apertures having divergent wall surfaces being disposed in substantially uniformly distributed relationship over the apertured area of said sheet-form plate, said bedplate being of a predetermined minimum thickness whereby said apertures with the divergent wall surfaces produce a controlling effect on the flow path of gaseous fluid exiting from those apertures to cause at least a portion of the gaseous fluid exiting therefrom to initially flow along paths laterally divergent to the aperture's longitudinal axis and passing through a bed of particulate material traversing over said bedplate thereby producing dispersion of the gaseous fluid in a generally upward direction along random flow paths through the bed of particulate material for causing substantially uniform levitation and agitation of the particulate material, and a gaseous fluid source coupled with said treating chamber operable to effect a flow of gaseous fluid through said apertures at a rate of flow effecting levitation and agitation of the particulate material traversing over said bedplate and thereby fluidizing the bed of particulate material, the gaseous fluid provided by said source having characteristics to effect treatment of the particulate material.

* * * * *